United States Patent
Bassin et al.

(10) Patent No.: US 7,831,868 B2
(45) Date of Patent: Nov. 9, 2010

(54) PROCESS FOR SOFTWARE SUPPORT RESOURCE ALLOCATION BASED ON ANALYSIS OF CATEGORIZED FIELD PROBLEMS

(75) Inventors: Kathryn Allyn Bassin, Harpursville, NY (US); Wanli Min, Mount Kisco, NY (US); Bonnie Kathryn Ray, Nyack, NY (US); Padmanabhan Santhanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/062,270

(22) Filed: Apr. 3, 2008

(65) Prior Publication Data
US 2008/0183422 A1    Jul. 31, 2008

Related U.S. Application Data

(63) Continuation of application No. 11/449,735, filed on Jun. 9, 2006.

(51) Int. Cl.
*G06F 11/00* (2006.01)

(52) U.S. Cl. .............................. 714/47; 714/26; 714/48; 714/57; 718/104

(58) Field of Classification Search .................. 714/26, 714/47, 48, 57; 718/104
See application file for complete search history.

(56) References Cited

U.S. PATENT DOCUMENTS 6,915,173 B2 *    7/2005    Chan et al. ..................... 700/44

* cited by examiner

*Primary Examiner*—Bryce P Bonzo
*Assistant Examiner*—Charles Ehne
(74) *Attorney, Agent, or Firm*—Whitham, Curtis, Christofferson & Cook, P.C.; Stephen C. Kaufman

(57) ABSTRACT

A method and system estimates future software support requirements based on statistical models of previous observations of support requests, either for the same product or for a different product having features previously identified as correlated with features of a new product. The estimates include an estimated volume of support requests and an estimated type of support requests. The estimated types include the activity occurring at the time of the failure, an identifier as to whether a defect in the software was previously known, and the like. The estimates are used to estimate and allocate support resources prior to support requests being received, and prior to a software product being released.

16 Claims, 7 Drawing Sheets

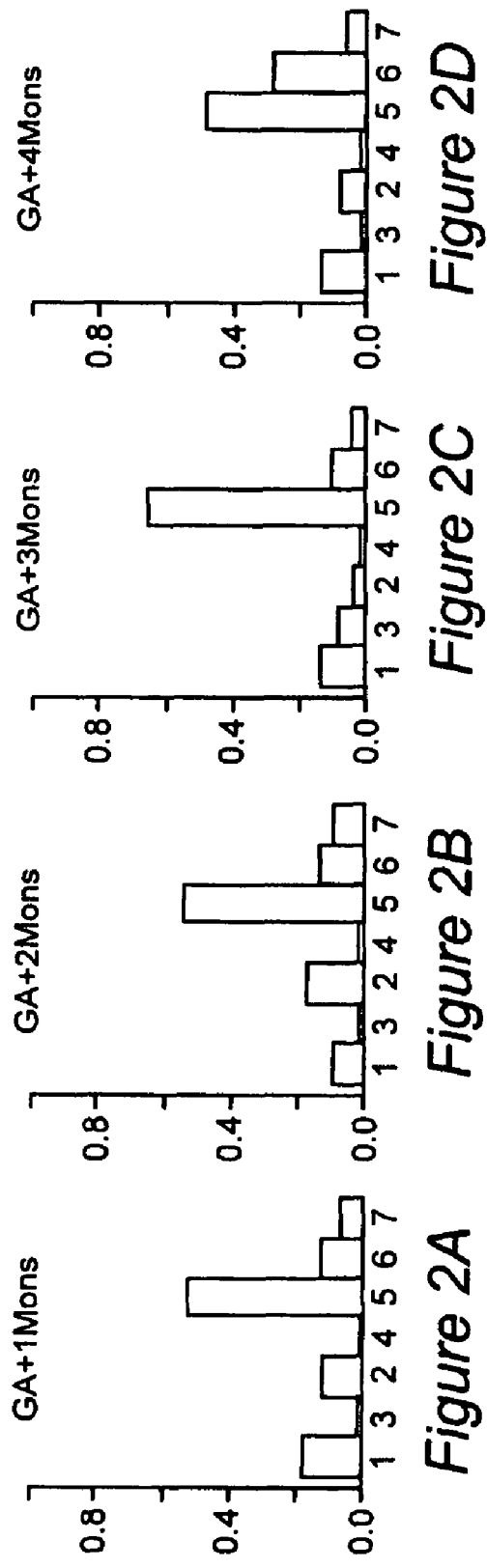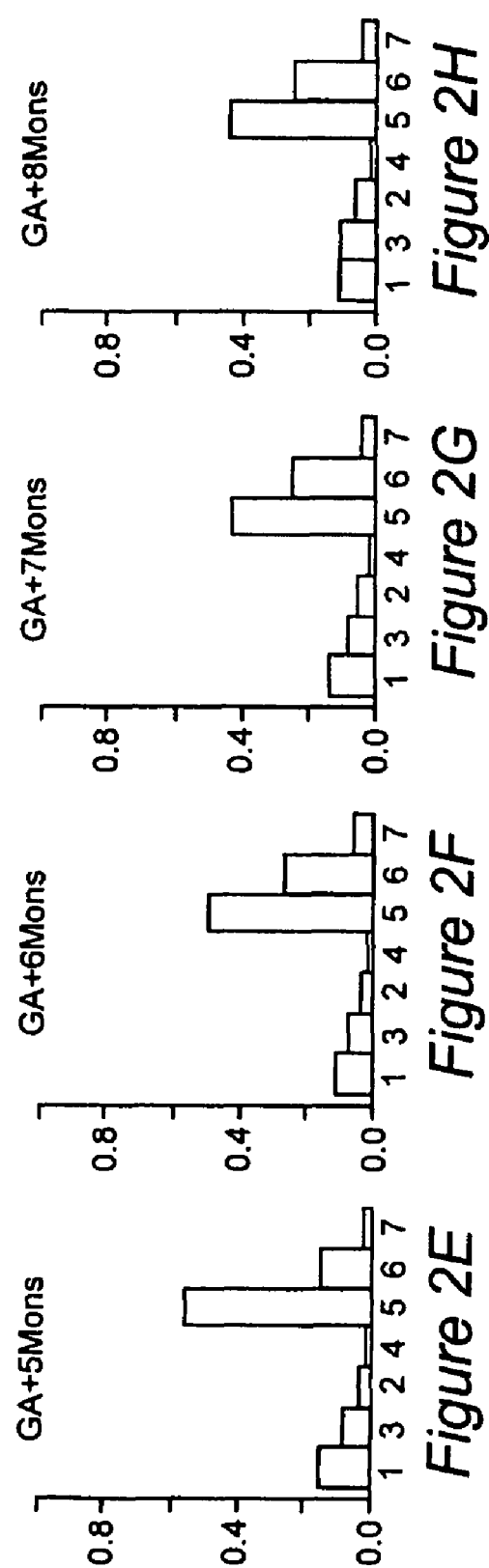
Figure 2A, Figure 2B, Figure 2C, Figure 2D, Figure 2E, Figure 2F, Figure 2G, Figure 2H

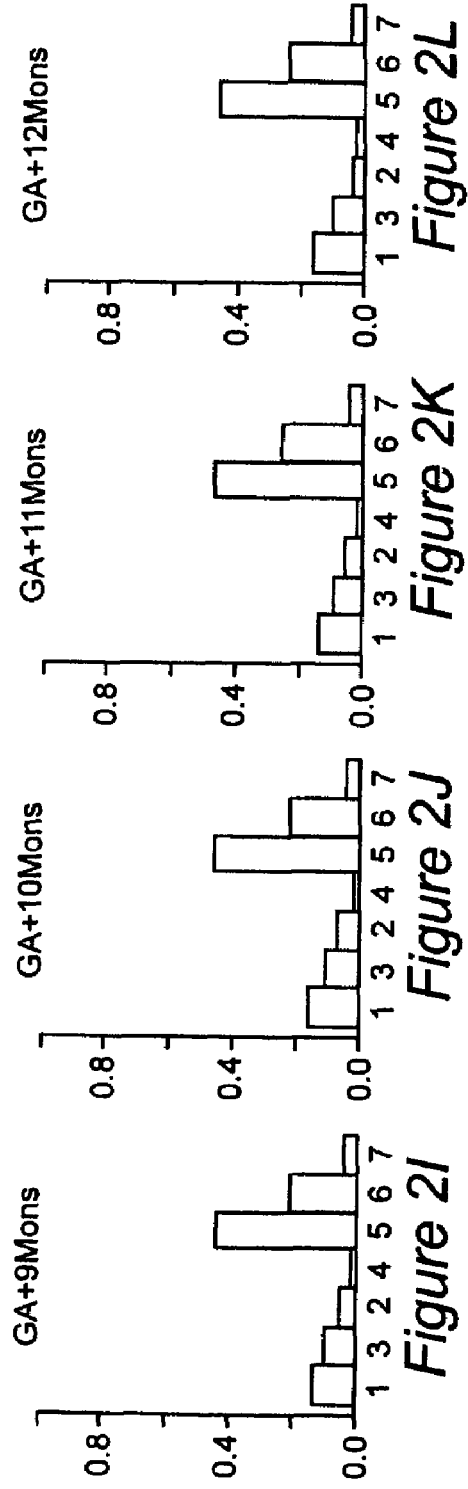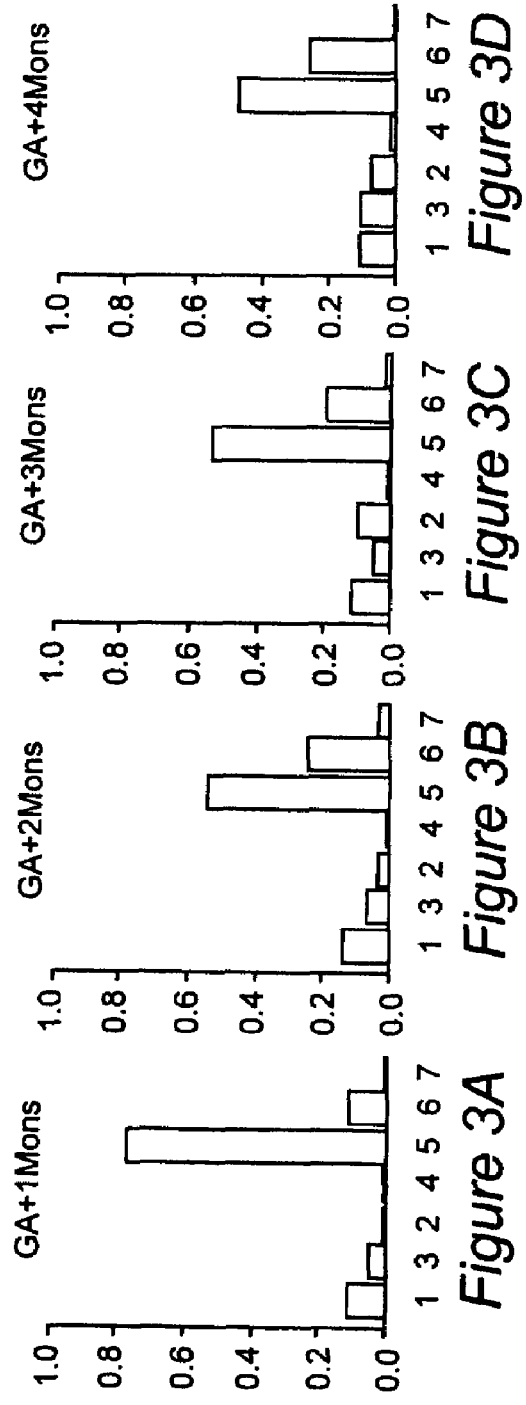

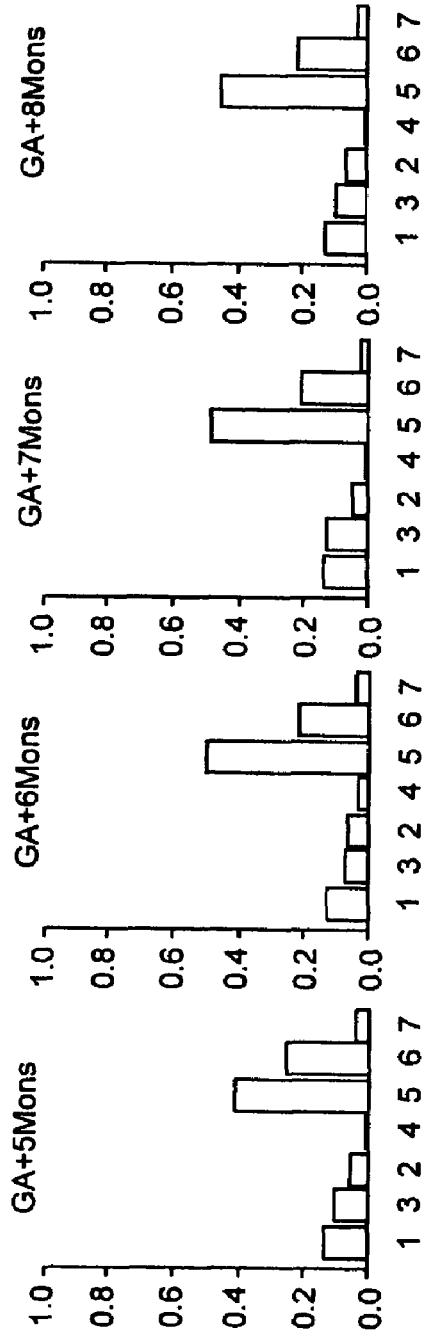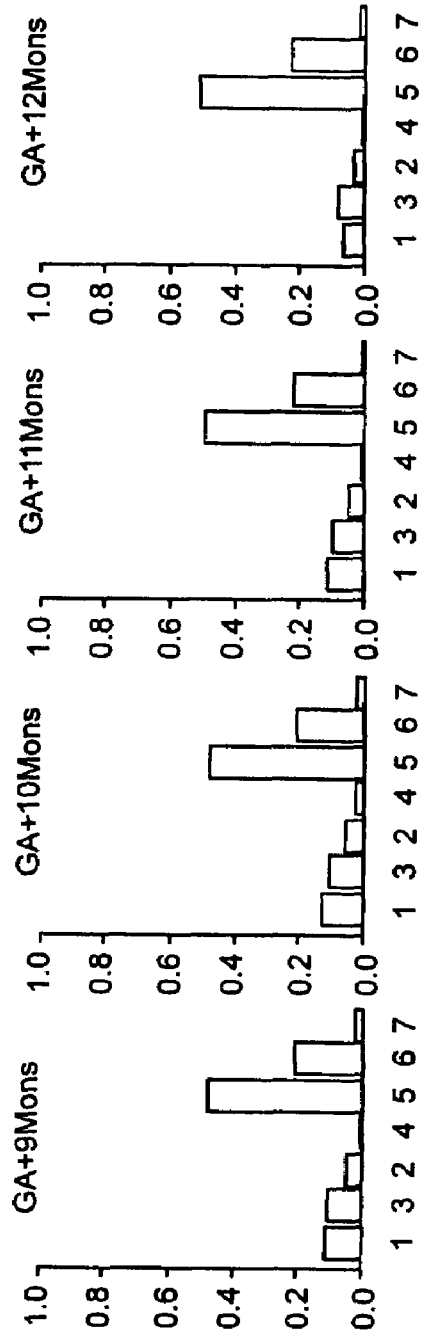

| ATTRIBUTE | NUMBER OF MONTHS AFTER GENERAL RELEASE | | | | |
|---|---|---|---|---|---|
| | 2 | 3 | 4 | 5 | 6 |
| CUSTOMER ACTIVITY | 1.30 1 0.25 | 8.44 4 0.08 | 5.05 6 0.54 | 12.48 6 0.05 | 9.54 6 0.15 |
| PROBLEM CATEGORY | 8.85 3 0.03 | 6.34 4 0.18 | 5.49 3 0.14 | 8.33 3 0.04 | 9.01 3 0.03 |
| SITUATION | 14.56 1 0.00 | 4.27 3 0.23 | 4.93 4 0.29 | 19.26 5 0.00 | 2.61 3 0.46 |
| RESOLUTION | 7.56 3 0.06 | 5.86 5 0.32 | 13.84 7 0.054 | 9.30 9 0.43 | 6.75 7 0.46 |

*Figure 4*

| Example User Activity Attribute | Example Problem Attribute | | |
|---|---|---|---|
| | APAR OPENED | APAR/ DEFECT EXISTS | NO ASSOCIATED APAR |
| HW/SW Diagnostic, Run Diagnostic | + | 0 | - |
| Migration/Upgrade | 0 | 0 | 0 |
| Install | 0 | - | + |
| Planning Order & Upgrade | 0 | - | + |
| Run Normally - Problem Occurs | 0 | + | - |
| System Admin./Configuration | - | - | + |

*Figure 5*

| PROBLEM CATEGORY | NUMBER OF WEEKS AFTER GENERAL RELEASE | | | | | |
|---|---|---|---|---|---|---|
| | 63 | 64 | 65 | 66 | 67 | 68 |
| UNKNOWN | 12(10) | 11(9) | 9(9) | 4(8) | 7(8) | 5(8) |
| APAR/DEFECT EXISTS | 10(5) | 15(5) | 13(5) | 2(4) | 8(3) | 7(3) |
| NEW APAR OPENED | 64(65) | 83(62) | 51(58) | 53(55) | 41(52) | 52(48) |
| NO APAR/DEFECT OPENED | 10(6) | 12(6) | 14(6) | 6(5) | 2(5) | 5(5) |
| TOTAL VOLUME | 96(86) | 121(82) | 87(78) | 65(72) | 58(68) | 69(64) |

*Figure 8*

| | CUSTOMER ACTIVITY | | |
|---|---|---|---|
| TARGET | INSTALL | MIG/UPGRADE | PLANNING |
| CUSTOMER KNOWLEDGE/UNDER | 0(+) | 0(0) | +(+) |
| OTHER SW/HW | 0(0) | 0(--) | --(0) |
| PROD DESIGN FEATURE | 0(0) | 0(0) | 0(0) |
| VERSION/ LEVEL | 0(0) | 0(+) | 0(0) |

*Figure 9*

PROCESS FOR SOFTWARE SUPPORT RESOURCE ALLOCATION BASED ON ANALYSIS OF CATEGORIZED FIELD PROBLEMS

CROSS-REFERENCE TO RELATED APPLICATIONS

This application is a continuation of U.S. patent application Ser. No. 11/449,735, filed Jun. 9, 2006, and which is incorporated herein by reference.

BACKGROUND OF THE INVENTION

1. Field of the Invention

The present invention relates generally to allocation of software support resources and, more particularly, to estimating future support requirements using prediction models based on historical reports of problem type and problem quantity.

2. Description of the Prior Art

Predicting the expected number and types of customer reported problems after a software product has been released is a crucial requirement for software maintenance planning and for planning development of future releases of a software product.

Prior art methods and processes, however, for predicting support requirements for a software service or product do not predict particular categories of problems. Instead, such methods and processes predict only a volume of reported problems over a given time horizon. The resources, though, in terms of, for example, the number of service personnel and the qualifications of the service personnel, to solve customer problems does not depend solely on the problem volume. Therefore, allocating resources based on current estimation methods often results in mismatch of resources with problems that need to be addressed, resulting in inadequate resources to provide for customer needs.

SUMMARY OF THE INVENTION

It is therefore an object of the invention to provide a method and apparatus for quantitative analysis of customer reported problems, to assist in estimating support resource requirements and resources required for further development of a software product, and optimizing allocation of resources.

It is a further objective of the invention to analyze and compare statistics of customer reported problems for different software products, to assist in identifying particular groups or classes of products having similar problem characteristics, and thereby both improving software products and further assisting in optimizing allocation.

It is a further objective of the invention to analyze correlations and other statistics that describe relationships between the customer circumstances surrounding a reported problem, and the technical characteristics of the reported problem, to assist in identifying solutions and optimizing allocation of, and the efficiency in the application of, support resources.

The foregoing and other features and advantages of the present invention will be apparent from the following description of the preferred embodiments of the invention, which is further illustrated in the accompanying drawings.

BRIEF DESCRIPTION OF THE DRAWINGS

The subject matter of the present invention is particularly pointed out and distinctly claimed in the claims appended to this specification. The subject matter, features and advantages of the invention will be apparent from the following detailed description viewed together with the accompanying drawings, in which:

FIGS. 2A through 2L show an example of probability distributions of attributes characterizing problems or failures observed for a first example software, over an example sequence of example time intervals;

FIGS. 3A through 3L show an example of probability distributions of attributes characterizing problems or failures observed for a second example software, over an example sequence of example time intervals;

FIG. 4 shows an example sequential hypothesis testing for statistical stability, on the evolution of distributions such as, for example, those depicted by FIGS. 2A-2L and FIGS. 3A-3L;

FIG. 5 shows example calculations of a correlation between different ones of the example attributes characterizing problems or failures observed for an example software product;

FIG. 8 shows a comparison of example forecast user problems, broken down to an attribute level, to actual reported user problems; and FIG. 9 shows an example comparison of correlations between user activity attributes and solution attributes, for two different example software products.

DETAILED DESCRIPTION

Figure 1:
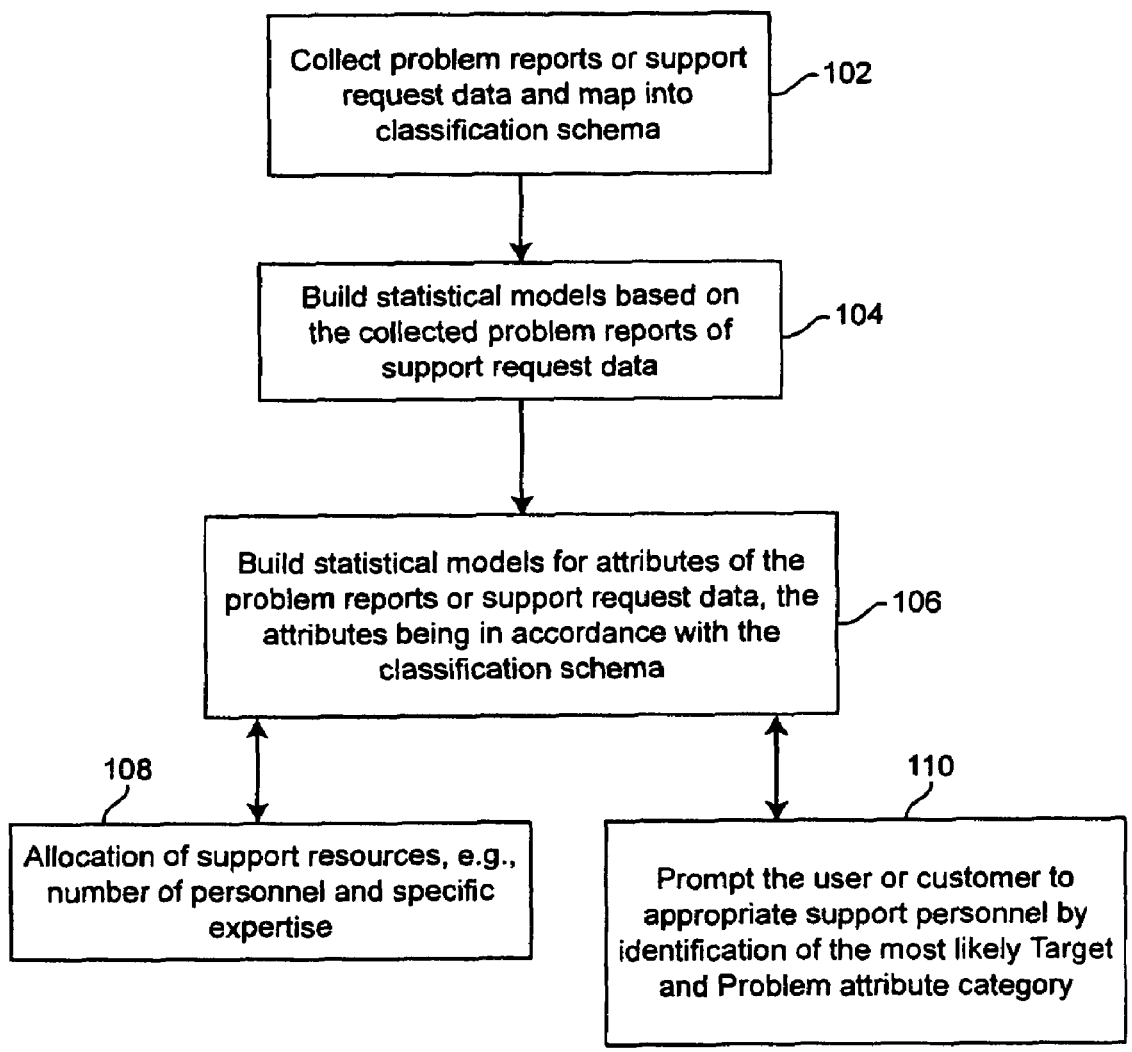
FIG. 1 is an example high level functional block diagram representing an example embodiment of the invention.

FIG. 1 is an example general functional diagram of an embodiment of the invention. It will be understood that the FIG. 1 arrangement of blocks is only an example, and selected for assist persons of ordinary skill in forming an understanding of principle aspects and features of the invention, without being limited to any specific hardware or software configuration. Other embodiments according to this invention, and other block diagram representations could be created, upon reading this disclosure, that break the depicted FIG. 1 blocks into sub-blocks, and that merge FIG. 1 blocks into a single block. It will also be understood, upon reading this description, that even in reference to the FIG. 1 example, not all of the blocks necessarily require operation every instance the invention is utilized.

Referring to the FIG. 1 example block diagram, functional Block 102 represents collecting into a database user problem reports, using an attribute-type problem classification schema as will be described in further detail. For consistency the problem reports will be referenced hereinafter as "PRPT" in the singular and "PRPTs" in the plural, but it will be understood that the format for the PRPTs is a design choice, readily selected or formulated by persons of ordinary skill upon reading this description. Functional Block 104 of FIG. 1 represents modeling as a time series the PRPTs, using any interval basis for the time series such as, for example, a weekly or monthly basis. As will be described in further detail, the PRPT is a record having a plurality of attributes that characterize each problem according to a classification schema, which will be described in further detail below.

Referring to FIG. 1, functional Block 106 performs a plurality of analyses on the time series generated by functional Block 104. Example analyses, which will be described in further detail, are correlation between different attributes of the problem reports. As will be understood after reading this disclosure, the results of functional Block 104 can be used to generate estimates of future values of the functional Block 104 time series, down to an attribute level. Stated differently, functional Block 106 provides estimates of both the quantity of user problems and the type of such problems.

With continuing reference to FIG. 1, functional Blocks 108 and 110 determine an optimized deployment, or allocation, of support personnel and other solution resources to meet the estimated future needs of the users, where "optimized" includes, for example, a support team staffed with persons having the most likely needed skills, and a solution resource set prioritized according to the estimated user activity that will be occurring when the problems are reported.

Referring again to FIG. 1, the first functional Block 102 collects a database of PRPTs, each having a set of attributes according to a schema selected such that the attributes characterize and describe enough aspects of the problem to enable construction of a mapping of problem attributes to skills required to service the problem. The attributes may, if desired, be collected in a structured way in the PRPT itself, or a method such as text mining of problem reports to create meaningful attribute categories could be applied to the PRPT database in an initial processing step (not shown). An example problem categorization schema could be similar to Orthogonal Defect Classification, commonly referred to by the acronym "ODC," a well-known categorization schema for software defects, described in numerous publications, see, for example, R. Chillarege et al., "Orthogonal Defect Classification—A Concept for In-Process Measurements," IEEE Transactions on Software Engineering, Vol. 18, No. 11, November 1992.

It will be understood that the described and claimed methods are not limited to any particular problem schema for classifying problems or to variations of ODC. Upon reading this description, a person skilled in the art can readily migrate the present method to other problem categorization schema, either written by that person or obtained, for example, from a commercial or academic source.

Still referring to FIG. 1, in a PRPT is preferably generated when the customer calls the software vendor, or the support vendor if that is the entity responsible for supporting the software. It will be understood that the word "customer" includes any end-user of the software product, regardless of whether the user is a "customer" in the business sense of the word. Stated differently, the "customer" could be within the same business entity as the support resource.

It will be understood that unless otherwise specified, labels such as "PRPT" are only for purposes of providing consistent, understandable reference to the disclosed examples of the invention. Stated another way, unless otherwise specified, the labels herein have no limitative meaning. Persons of skill in the art, when practicing the methods described herein, can use or devise any labeling or grouping of labels that they choose.

The format of the PRPTs determined by the particular attributes and format of the problem categorization schema that is used.

Attributes can be identified, grouped and sub-grouped in any way that the user desires. The criteria for selecting attributes may, for example, be comparable to those for selecting attributes in the Orthogonal Defect Classification (ODC) schema. ODC attribute selection criteria are well known in the art and, therefore, a detailed description is omitted. In summary, for ODC, and for any other problem classification schema chosen by the user, preferable criteria for selecting attributes include the attributes being orthogonal, that they span the sub-space of problems that the user wishes to identify, and that their number be sufficiently small enough to avoid confusing the user as to which attribute a problem feature fits into.

An example set of groups of problem attributes is: Customer Activity, Situation, Problem Category, Resolution, and Target. It will be understood that this arrangement and labeling of attribute groups is only for purposes of example. For example, the label "Customer Activity" may include activity by a user entity that is not, in a business sense, a "customer" of the software support provider, and can therefore be referenced as "user entity." Other groupings, arrangements and labeling of groups can be readily identified by person skilled in the art upon reading this description.

Referring to the above-identified example set of attribute groups, namely Customer Activity, Situation, Problem Category, Resolution, and Target, the PRPTs collected during functional Block 102 can have the following example specific attribute values:

Customer Activity: the attribute values within this group describe or define the user or customer activities taking place when assistance was required from the support center. An example set of values for this group of attributes are: System Configuration, Migration or Upgrade, Other Software Installation/Change Application Development, Running Normally Then Problem Occurs, and Problem Occurs on Recovery/Restart. An example meaning for each of these example Customer Activity attributes is as follows: System Configuration refers to setting parameters of the hardware and/or software system necessary for the specific software product to run. Installation refers to installing the software on the customer's system. The example Customer Activity attribute of Migration or Upgrade means whether or not the customer was migrating the software from one system to another and Upgrade means that the user was upgrading from a previous version of the subject software to the version exhibiting the problem. The example attribute of Other Software Installation/Change Application Development refers to the installation or change in a different software product that subsequently results in the subject software exhibiting a problem. The example Customer Activity attributes of Running Normally-Then Problem Occurs, and Problem Occurs on Recovery/Restart are self-explanatory. Example attribute levels within each of the above-identified example attribute groups are as follows:

Situation: The attribute values within this group define the type of problem for which assistance is required. Example values include Abend/Crash/Outage, Hang/Wait/Loop, Unexpected Results and Abnormal Performance.

Problem Category: The attribute values within this group define the final disposition of the PRPT. Example values for such attributes include, but are not limited to, No Software Defect Found, Software Defect Known, and New Software Defect Found. Other example names for these attributes are those used by International Business Machines (IBM), which are: "Not Entitled for Support," "No APAR Opened," "APAR Exists," and "New APAR." These specific names are based on the "Authorized Program Analysis Report," also known by its acronym "APAR", which is a named issue with an IBM program, opened after the customer or IBM support personnel discover a problem with the database software code. Every APAR has a unique identification number. It will be understood that the described Problem Category attribute group of the PRPT, through the estimation method of this invention, is preferably complementary to the Orthogonal Defect Classification schema, or ODC. It is complementary because the described method can show correlation between particular software defects or defect types and how the defect affects particular users, e.g., what group or type of users is more likely to be affected by the defect.

Resolution: The attribute values within this group define or characterize the immediate response to the PRPT upon closing. Preferably, "Resolution" attributes characterize or refer to the way in which the problem was resolved if viewed from a non-technical perspective. Example values for these attributes include, but are not limited to, one or more of: Permanent Solution Provided and Confirmed, Permanent Solution Provided But Not Confirmed, Customer Resolved The Problem, and Workaround Provided.

Target: The attribute values within this group define or characterize the nature and/or type of change performed or effects to solve the problem. Stated differently, "Target" attributes characterize the way in which the software product was changed to fix the problem. Example values for these attributes include, but are not limited to, one or more of: Customer Knowledge/Understanding, Customer Code/Configuration, Install Options or Procedure, Change Product Function, Remove Code Defect.

The problem classification schema attributes can be further divided into two types of attributes—a first type comprising the attributes determined or defined when the problem is reported, and a second type comprising the attributes determined or defined when the problem is closed, or resolved. For purposes of reference within this description, these will labeled as Opening Attributes and Closing Attributes, respectively. Applying this to the specific example attribute groupings and example attributes described above, Opening Attributes are Customer Activity and Situation, because these are defined when the problem is reported, and Closing Attributes are the attributes under the Problem Category, Resolution and Target groupings, because these are defined when, or as of, the problem being closed.

Referring to FIG. 1, functional Block 102 collects a database of problem reports, i.e., PRPTs according to the labeling used in this example, and then functional Block 104 performs statistical analyses to identify the time-evolving pattern of the distribution of the attributes. An example identifies the time-evolving pattern of the monthly distribution of the PRPT attributes. The distribution can be on a weekly or bi-weekly basis as well, and the time origin can be arbitrarily selected, but for purposes of estimating support resource allocation over the life of a product, the release date is generally picked as the origin.

FIGS. 2A through 2L show a sequence of twelve per-month PRPT attribute distributions of Customer Activity for a first example software product. The PRPT attribute distribution 2A represents the attribute distribution one month after general release, distribution 2B represents the attribute distribution two months after general release, and distribution 2L represents the attribute distribution twelve months after general release. For the example of FIGS. 2A through 2L, the per-month distributions are for seven attribute levels of Customer Activity, represented by seven bars respectively positioned on the horizontal axis as follows: Application Development, Hardware/Software Diagnosis, labeled as 1; Attempting to Run Diagnostic Aids, Order/Upgrade, Other Software Installation/Change, Planning, labeled as 2; Migration/Upgrade, labeled as 3; Other Hardware Installation/Change, Recovery/Restart, labeled as 4; Running Normally-Then Problem Occurs, labeled as 5; System Administrator/Configuration, labeled as 6; and Unknown, labeled as 7.

Referring still to FIGS. 2A-2L, the height of the bars represents the probability, ranging from zero to one, of the corresponding Customer Activity attribute, e.g., Migration/Upgrade 4, being that which existed at the time of the problem.

FIGS. 3A through 3L, which are labeled identical to FIGS. 2A through 2L, show a sequence of twelve per-month PRPT attribute distributions of Customer Activity for a second example software product.

Referring FIGS. 2A through 2L and FIGS. 3A through 3L, it is clear that the probability distributions of Customer Activity values stabilizes at a certain number of months after release.

The stability of the distribution of PRPT attribute values over time can be tested using a Pearson $X^2$ procedure, because the distribution is categorical in nature. An example of such a Pearson $X^2$ test will be described. As a preliminary matter, it is known in the art that a minimum quantity of observations is required for a Pearson $X^2$ to be valid with respect to a predetermined confidence level. Therefore, when the number of observations of a particular Customer Activity attribute level is below that minimum, the observations are aggregated with other Customer Activity attribute levels. Such aggregation methods are known in the art and, therefore, further description is not necessary.

FIG. 4 shows a sequential hypothesis testing on the evolution of probability distributions such as, for example, those depicted by FIGS. 2A-2L and FIGS. 3A-3L, for purposes of showing that the distributions stabilize at some time after release. Referring to FIG. 4, the column numerals represent, i.e., "2", "3" through "6", the number of months after product release, and the four major rows represent, respectively, in top-down order, statistical values for Customer Activity, Problem Category, Situation and Resolution attributes in that month. Each of the rows has three sub-rows that represent, respectively, in top-down order, the test statistic value, degrees of freedom, and p-value. The "test statistic value" refers to the computed value of the statistical test used to determine whether a change in the distribution of problem attributes has occurred. The "degrees of freedom" is a parameter associated with the test statistic, determined by the number of classes of each attribute. The p-value is the computed probability of obtaining a test statistic value as large or larger than that computed from the observed data, assuming that no change in distribution of problem attributes has occurred.

The $X^2$ test in FIG. 4 can be illustrated in the framework of a two-way contingency table, where the column factor is the number of months after the release date and the row factor is the attribute being considered. To test that the distribution of the attribute becomes invariant at the $k^{th}$ month after product release, the null hypothesis is that the distribution of the row factor, in this example the attribute of the classification schema, is independent of the column factor, i.e., the k value which, in this example, is the number of months after product release. The Pearson $X^2$ test statistic is:

$$X^2 = \sum_{r,c} \frac{(\eta_{r,c} - \mu_{r,c})^2}{\mu_{r,c}} \sim X^2_{(r-1)(c-1)} \qquad \text{(Eq. 1)}$$

Referring to FIG. 1, functional Block 106 performs additional analyses on the observed PRPTs over a given time period, or sequence of time periods, and examples include calculation of statistics such as, for example, the correlation between various problem classification attributes. An example of such correlation is that between Customer Activity values and Problem Category values.

FIG. 5 shows an example of the functional block 106 calculations of correlation between Customer Activity values and Problem Category values are depicted. The FIG. 5 example table has six rows representing six example Customer Activity attributes, which are, in top to down descending order, Hardware/Software Diagnostic, i.e., the customer running a hardware or software diagnostic procedure, Migration/Upgrade, Installation, Planning Order and Upgrade, Running Normally When Problem Occurs, and System Administration/Configuration. The FIG. 5 example table shows, arranged as columns in left-to-right order, an example of three Problem Category values, which are APAR Opened, APAR/Defect Exists, and No Associated APAR. These example Problem Category values are defined as follows: APAR opened: a new defect record is created describing the problem. APAR/Defect exists: The reported problem is related to a defect in the product, however a record already exists describing the same defect. No Associated APAR means that the reported problem has to do with an issue that is not a code defect.

Referring again to FIG. 5, a table entry of "+" represents the respective Customer Activity and Problem Category attributes as having a strong positive correlation. It will be understood that the number and type of Customer Activity attributes, and or Problem category attributes depicted by the rows and columns of FIG. 5, and the labeling of the correlation value, is only an example.

The example FIG. 5 correlations are preferably calculated as follows: The column sum, $\eta_{+,c}$, is defined as $\eta_{+,c}=\Sigma_r \eta_{r,c}$; the row sum, $\eta_{r,+}$, is defined as $\eta_{r,+}=\Sigma_c \eta_{r,c}$; and the overall or grand total, $\eta$, is defined as $\eta=\Sigma_{r,c} \eta_{r,c}$.

Using the null hypothesis that row and column attribute values are independent, the expected entry in cell (r, c) is:

$$\mu_{r,c} = \eta_r + \frac{\eta_{+,c}}{\eta} \tag{Eq. 2}$$

The adjusted residual has an asymptotic normal distribution, i.e., $$\delta_{r,c} = \frac{\eta_{r,c} - \mu_{r,c}}{\sqrt{\mu_{r,c}\left(1 - \frac{\eta_{+,c}}{\eta}\right)\left(1 - \frac{\eta_{r,+}}{\eta}\right)}} \tag{Eq. 3}$$

A value of $\delta_{r,c}>2$ indicates a significant (at level 5%) positive correlation, i.e., a strong deviation from independence, and $\delta_{r,c}>2$ is an example threshold for entering a value of "+" in the correlation tables depicted in FIG. 5. An example of the usefulness of calculating the correlations calculated Referring, if we identify the Customer Activity of one reported case as "Planning order & upgrade", then this case's Problem Category is more likely to be "No Assoc APAR" and less likely to be "APAR/defect exist".

Figure 6:
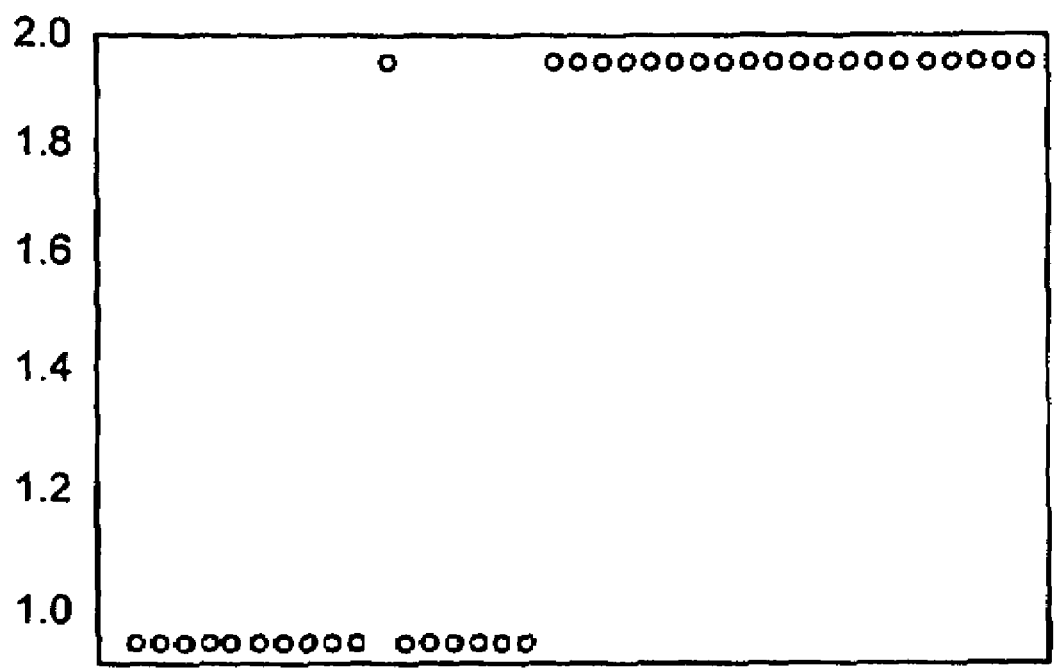
FIG. 6 shows an example of a sequence of the most likely hidden states, on a weekly basis, of user knowledge of an example product.

Referring again to FIG. 1, the above-described time-series modeling performed by functional Block 104 can be used to forecast, for example, the total volume of customer-reported problems, and the volume on an attribute level, either for a subsequent release or version of the same software product or a general release of a different software product. An example analyses for generating parameters of the assumed model is to view the number of instances of one or more attributes in a fixed length of time as a Poisson Hidden Markov Model, referenced hereinafter as "PHMM" for brevity. The hidden process of the Markov chain approximates, to a usable accuracy, the dynamics of, for example, the user group. An example dynamic is the proportion of users that are inexperienced in a skill or lack a knowledge pertaining to the product. The PHMM can be described to a detail understandable by one of skill in the art as follows:

$$Y_{t_j}|(s_{t_j}=s) \sim \text{Poisson}(m_{t_j,s}), s=\{1,2,3\} \tag{Eq. 4}$$

$$m_{t_j,s} = N_s(FW_s(t_j) - FW_s(t_{j-1})) \tag{Eq. 5}$$

$$\left(Y_{t_j}^{(1)}, Y_{t_j}^{(2)}, \ldots, Y_{t_j}^{(K)} \mid Y_{t_j} = \sum_{k=1}^{K} Y_{t_j}^{(K)}, s_{t_j} = s\right) \leftarrow \tag{Eq. 6}$$

$$\text{Multinomial}(p_{t_j,s}^{(1)}, p_{t_j,s}^{(2)}, \ldots, p_{t_j,s}^{(K)}),$$

where Y is the vector of the number observations associated with types of attributes of the problem report records, and FW is the cumulative distribution function of certain parametric distributions, such as the Weibull distribution. As understandable to one of ordinary skill upon reading this description, the parameters can, for example, be estimated by maximizing the likelihood function of the assumed probability distribution given the observed values. After the parameters are estimated, estimation of future observations of Y is achieved by, for example, the minimum mean square error method or equivalents thereof. This example method will inherently provide an estimated time after a product's general release for a subject attribute of user problems to reach maturity, i.e., statistical stability, by, for example, tracing the sequence of most likely states obtained through the Viterbi algorithm. FIG. 6 shows an example of a sequence of the most likely hidden states, on a weekly basis, of user knowledge of a particular product, for a time range of two weeks after general release to 36 weeks after general release. As can be seem from FIG. 6, the attribute representing user knowledge is two-valued and, therefore, the state in terms of that attribute is also two-valued. The predictions may be obtained based on, for example, the following conditional mean calculation:

$$E[Y_{t+1}^k] = \sum_{s=1}^{No.ofstate} E[Y_{t+1}^k \mid S_{t+1}=s]P(S_{t+1}=s) \tag{Eq. 7}$$

Figure 7:
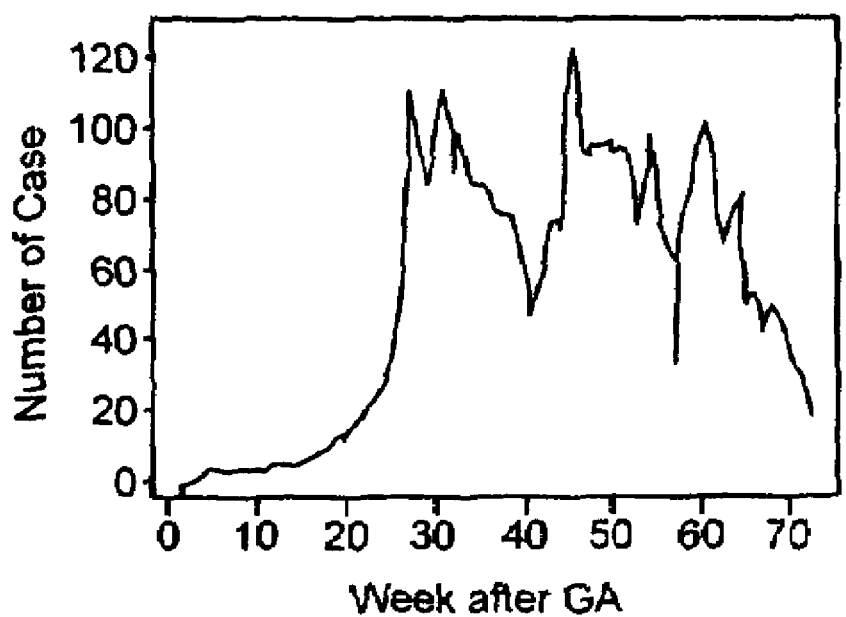
FIG. 7 shows an example time series forecast of user problems for an example software product, based on models constructed from previous reported problems.

FIG. 7 shows an example time series forecast of the total volume of customer reported problems for a particular software product, starting from six months after the general release date. Using the example labeling in this description, the start date would be k=6, with k ranging from 6 months (or other time intervals) to 70 months.

FIG. 8 shows a comparison of a weekly volume forecast of Problem Category attribute values, for general release plus 63 months through general release plus 68 months, for the example attributes of Unknown, APAR/Defect Exists; New APAP Opened; No APAR/Defect Opened. Each column is numbered according to the number of weeks after general release. The example attributes forecast are in row order, from top to bottom: Unknown, APAR/Defect Exists; New APAP Opened; and No APAR/Defect Opened, with the last row being the total volume of problem reports, or PRPTs according to the example labeling herein. Each volume entry has a pair of values, the first being the actual observed value and the second, which is in parentheses, being the forecast value. As can be seen from FIG. 8, the forecasted values are close to the actual observed values, with the exception of the 64$^{th}$ week.

FIG. 9 shows that products can be clustered based on the similarity of the probability distribution of their problem attributes, e.g. their problem classification attributes, over time. Stated with more particularity, FIG. 9 shows a comparison of the correlation of Target attributes and User Activity Attributes, for two different example software products. Referring again to FIG. 9, the example User Activity attributes, arranged by column, in left to right order, are: Install; Migrate/Upgrade; and Planning. The example Target attributes, arranged by row, in top to bottom order, are: Customer Knowledge/Understanding; Other Software/Hardware; Product Design/Feature; and Version/Level. The correlation values for the one of the two example products are in parenthesis; the correlation value for the other of the two products is not in parenthesis.

The present invention can, using the analysis exampled by FIG. 9, further assist in optimizing support resources, and reducing support requirements, because it permits identification of common features and functionality of products in the same cluster, and thereby provides information on how PRPTs are related to product characteristics. This in turn provides valuable information for projecting the types of customer reported problems expected for a new product, prior to its release.

Referring to FIG. 1, functional Block 108 generates an estimated requirement, and, for example, a proposed personnel-specific plan, for allocation of resources for a particular product. The estimated requirement and, if chosen, personnel-specific plan would include, for example, the number of persons having specific levels of expertise, and the number of hours, or days that each persons' assistance would be needed. Functional Block 108 could interface with, or employ, a scheduling database showing support personnel availability, travel preferences, and other personnel attributes useful generating a plan. Functional Block 110 prompts the customer, i.e., the entity using the software for which problems have been observed, and for which estimates of post-release support have been generated using functional Blocks 104 and 106, to the appropriate support personnel by identifying the most likely Target Attributes and Problem attributes.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. A method for estimating resource requirements of a software code comprising:
    a) receiving, over a first plurality of time intervals, a plurality of first support requests from users of a first software code representing a corresponding plurality of failures associated with said first software code, each of said first support requests including a plurality of failure attributes representing aspects of the particular failure corresponding to the request, including the user activity when the failure occurred;
    b) accumulating a database of said first support requests;
    c) receiving a plurality of resolution reports, reflecting actions taken to resolve said plurality of failures, each of said resolution reports including resolution attributes characterizing a skill level;
    d) generating a statistical model of said received plurality of first support requests, including a probability distribution of said failure attributes with respect to the particular time interval within said first plurality of time intervals;
    e) estimating a future receipt of a plurality of second support requests reflecting estimated failures of a second software code over a plurality of future time intervals, based on said statistical model, said estimating including an estimation of a likely quantity and likely attribute distribution of said second support requests with respect to time, over said plurality of future time intervals; and
    f) estimating a resource requirement for said second software code, based on said estimating a future receipt of said plurality of second support requests and said plurality of resolution reports.

2. The method of claim 1, wherein said estimated resource requirement is a support resource requirement, including an estimated requirement as to the level of technical expertise of support personnel.

3. The method of claim 2, wherein said failure attributes include a user activity attribute and a situation attribute.

4. The method of claim 3, further comprising calculating a correlation between at least one of said user activity attributes and at least one of said situation attributes and wherein said estimating a future receipt of a plurality of second support requests is based, in part, on said calculated correlation.

5. The method of claim 1, wherein said estimated resource requirement is a development resource requirement, including an estimated requirement for developing said second software code to affect said estimated future receipt of a plurality of second support requests.

6. The method of claim 5, further comprising calculating a correlation between said at least one user activity attributes and said at least one of said situation attributes for plurality of software products.

7. The method of claim 6, further comprising calculating a correlation between at least one of said user activity attributes and at least one of said situation attributes and wherein said estimating a future receipt of a plurality of second support requests is based, in part, on said calculated correlation.

8. The method of claim 1, wherein said failure attributes include a user activity attribute and a situation attribute.

9. The method of claim 8, further comprising calculating a correlation between at least one of said user activity attributes and at least one of said situation attributes and wherein said estimating a future receipt of a plurality of second support requests is based, in part, on said calculated correlation.

10. The method of claim 1, wherein said support request records further comprise a problem category attribute characterizing a state of a code defect being known or not known with respect to a software associated with said record.

11. The method of claim 1, wherein said support request records further comprise a target attribute characterizing a solution being identified for a problem associated with said records.

12. A method for estimating resource requirements of a software code comprising:
    a) receiving, over a first plurality of time intervals, a plurality of first support requests from users of a first software code representing a corresponding plurality of failures associated with said first software code, each of said first support requests including a plurality of failure attributes representing aspects of the particular failure corresponding to the request, including a user activity attribute reflecting the user activity when the failure occurred and a situation attribute reflecting the situation when the failure occurred;

b) accumulating a database of said first support requests;

c) receiving a plurality of resolution reports, reflecting actions taken to resolve said plurality of failures, each of said resolution reports including resolution attributes characterizing a skill level;

d) generating a statistical model of said received plurality of first support requests, including a probability distribution of said failure attributes with respect to the particular time interval within said first plurality of time intervals;

e) calculating a correlation between said at least one of said user activity attributes and said at least one of said situation attributes;

f) repeating (a) through (e) for a plurality of other software codes and generating a corresponding plurality of statistical models; and g) clustering said plurality of other software codes, based on a comparison of their respective correlations between user activity attributes and situation attributes.

13. The method of claim 12, further comprising estimating a future receipt of a plurality of second support requests representing a corresponding plurality of failures associated with a second software code, based on at least one of said statistical models.

14. The method of claim 13, further comprising estimating a resource requirement for said second software code, based on said estimating a future receipt of said plurality of second support requests.

15. The method of claim 14, wherein said estimated resource requirement is a support resource requirement, including an estimated requirement as to the level of technical expertise of support personnel.

16. A computer readable storage medium storing computer executable code for estimating resource requirements of a software code, said computer executable code when executed by a processor implementing the steps of:

a) receiving, over a first plurality of time intervals, a plurality of first support requests from users of a first software code representing a corresponding plurality of failures associated with said first software code, each of said first support requests including a plurality of failure attributes representing aspects of the particular failure corresponding to the request, including the user activity when the failure occurred;

b) accumulating a database of said first support requests;

c) receiving a plurality of resolution reports, reflecting actions taken to resolve said plurality of failures, each of said resolution reports including resolution attributes characterizing a skill level;

d) generating a statistical model of said received plurality of first support requests, including a probability distribution of said failure attributes with respect to the particular time interval within said first plurality of time intervals; and e) estimating a future receipt of a plurality of second support requests reflecting estimated failures of a second software code over a plurality of future time intervals, based on said statistical model, said estimating including an estimation of a likely quantity and likely attribute distribution of said second support requests with respect to time, over said plurality of future time intervals; and f) estimating a resource requirement for said second software code, based on said estimating a future receipt of said plurality of second support requests and said plurality of resolution reports.

* * * * *